(12) United States Patent
Konrad et al.

(10) Patent No.: US 9,054,353 B2
(45) Date of Patent: Jun. 9, 2015

(54) SUPPLY ASSEMBLY FOR COUPLING TO A FUEL CELL DEVICE AND FUEL CELL SYSTEM HAVING THE SUPPLY ASSEMBLY

(75) Inventors: Gerhard Konrad, Ulm (DE); Heiner Kunckel, Heroldstatt (DE); Martin Heumos, Finning (DE)

(73) Assignee: Daimler AG, Stuttgart (DE)

( * ) Notice: Subject to any disclaimer, the term of this patent is extended or adjusted under 35 U.S.C. 154(b) by 1056 days.

(21) Appl. No.: 13/129,608

(22) PCT Filed: Oct. 29, 2009

(86) PCT No.: PCT/EP2009/007753
§ 371 (c)(1),
(2), (4) Date: May 17, 2011

(87) PCT Pub. No.: WO2010/057567
PCT Pub. Date: May 27, 2010

(65) Prior Publication Data
US 2011/0223498 A1  Sep. 15, 2011

(30) Foreign Application Priority Data
Nov. 19, 2008 (DE) .......................... 10 2008 058 072

(51) Int. Cl.
*H01M 8/06* (2006.01)
*H01M 8/04* (2006.01)

(52) U.S. Cl.
CPC ...... *H01M 8/04149* (2013.01); *H01M 8/04126* (2013.01); *H01M 8/04156* (2013.01); *H01M 8/04119* (2013.01); *H01M 8/04111* (2013.01); *H01M 8/04141* (2013.01); *H01M 8/04164* (2013.01); *Y02E 60/50* (2013.01)

(58) Field of Classification Search
None
See application file for complete search history.

(56) References Cited

U.S. PATENT DOCUMENTS

| 5,194,154 A | 3/1993 | Moyer et al. |
| 2001/0010875 A1 | 8/2001 | Katagiri et al. |
| 2001/0021467 A1 | 9/2001 | Suzuki et al. |
| 2001/0021468 A1* | 9/2001 | Kanai et al. ................ 429/12 |
| 2002/0155328 A1 | 10/2002 | Smith et al. |
| 2003/0091881 A1 | 5/2003 | Eisler et al. |
| 2004/0234829 A1 | 11/2004 | Sederquist et al. |
| 2005/0282051 A1 | 12/2005 | Zhou |

(Continued)

FOREIGN PATENT DOCUMENTS

| CN | 1774831 A | 5/2006 |
| DE | 102007003144 A1 | 7/2008 |

(Continued)

*Primary Examiner* — Ula C Ruddock
*Assistant Examiner* — Matthew Van Oudenaren
(74) *Attorney, Agent, or Firm* — Stephan A. Pendorf; Patent Central LLC

(57) ABSTRACT

A supply assembly and a fuel cell system having a supply assembly that demonstrates a cost-effective and/or resilient design in operation. A supply assembly for coupling to a fuel cell device is proposed, having a gas-to-gas humidifier that is designed and/or arranged in order to humidify the oxidation means A for the fuel cell device by means of the humidity from the exhaust gases B of the fuel cell device has an exhaust gas region and an oxidation means region that are separated from one another by a separation layer. The separation layer enables a transmission of the humidity from the exhaust gas region into the oxidation means region for humidification of the oxidation means A, wherein the gas-to-gas humidifier has a monolithic honeycomb structure for fowling the exhaust gas region and the oxidation means region.

15 Claims, 2 Drawing Sheets

(56) References Cited

U.S. PATENT DOCUMENTS

Figure 1:
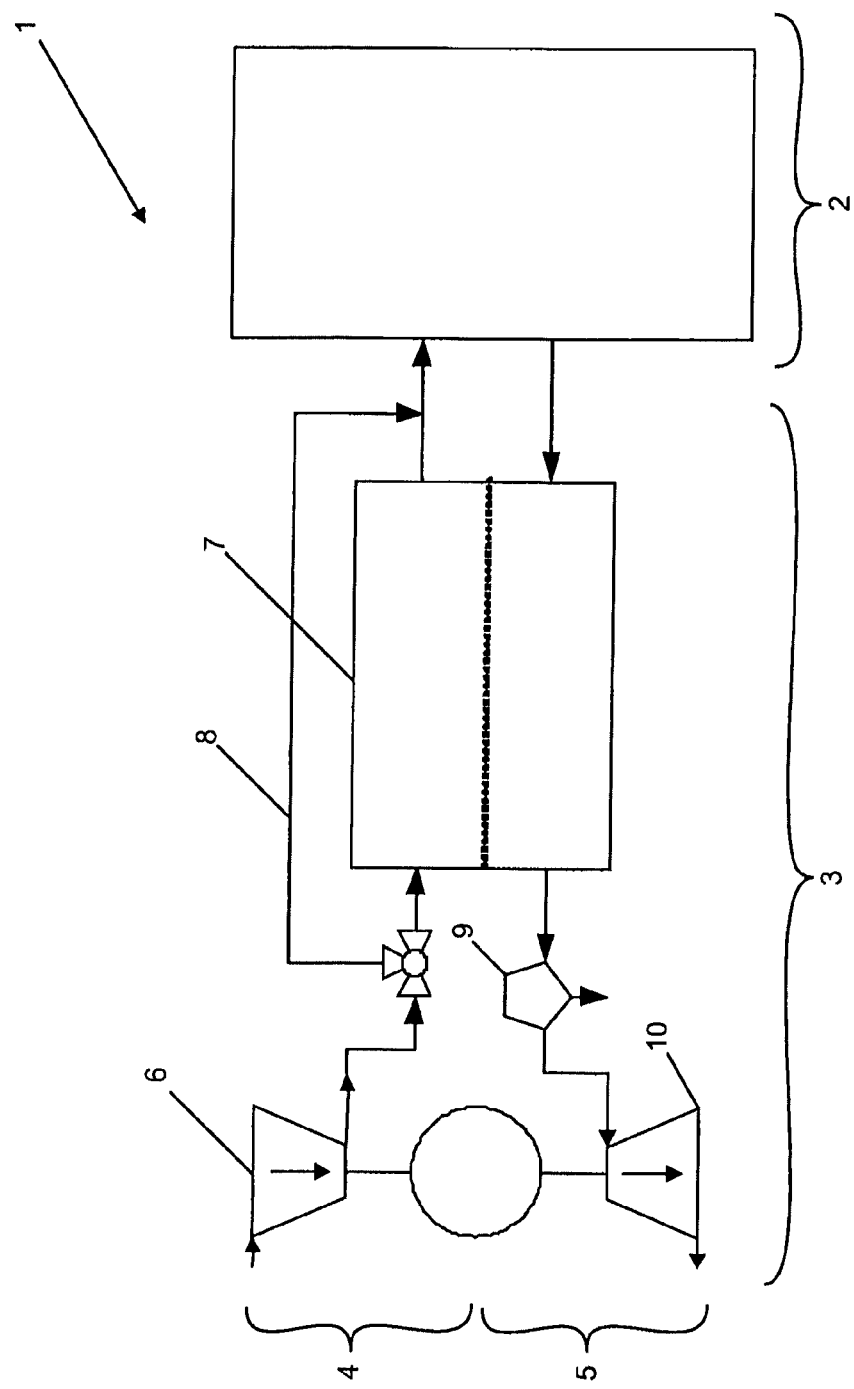

| | | | |
|---|---|---|---|
| 2007/0122669 A1* | 5/2007 | Kusano et al. | 429/26 |
| 2010/0009226 A1 | 1/2010 | Konrad et al. | |
| 2010/0019400 A1* | 1/2010 | Robb et al. | 261/101 |

FOREIGN PATENT DOCUMENTS

| | | | |
|---|---|---|---|
| JP | 6351923 A | | 3/1988 |
| JP | 6318304 B2 | | 4/1988 |
| JP | 63209729 A | | 8/1988 |
| JP | 8283002 A | | 10/1996 |
| JP | 2001351655 A | | 12/2001 |
| JP | 2003322354 A | | 11/2003 |
| JP | 2004355843 A | | 12/2004 |
| JP | 2006339103 A | | 12/2006 |
| JP | 2008243764 A | | 10/2008 |
| WO | 2004079269 A2 | | 9/2004 |

* cited by examiner

SUPPLY ASSEMBLY FOR COUPLING TO A FUEL CELL DEVICE AND FUEL CELL SYSTEM HAVING THE SUPPLY ASSEMBLY

The invention relates to a supply assembly for coupling to a fuel cell device with a gas-to-gas humidifier, which is formed and/or arranged to humidify the oxidation means for the fuel cell device with the humidity from the exhaust gases of the fuel cell device, wherein the gas-to-gas humidifier has an exhaust gas region and an oxidation means region, which are separated from each other by a separation layer, wherein the separation layer enables a transmission of the humidity from the exhaust gas region to the oxidation means region for humidifying the oxidation means. The invention also relates to a fuel cell system with the supply assembly.

With fuel cell systems, the conditioning of the usage gases, that is particularly of the oxidation means and the fuel, play an important role in order to ensure an efficient energy yield and a long life span of the fuel cell system. For conditioning the oxidation means, it is usual to first compress it for pressure increase and to cool it subsequently. As the membranes arranged in a fuel cell system, which separate an anode space from a cathode space in the individual fuel cells, usually so-called polymer electrolyte membranes (PEM) are sensitive to drying out, it has to be ensured at all times that the oxidation means is also humidified sufficiently. This humidification is usually ensured by humidification devices in the supply lines of the fuel cell system.

One example for a fuel cell system is shown in the specification US 2005/0282051A1, which discloses a honeycomb structure fuel cell system that converts chemical energy into electrical energy. In the introduction of the specification, two construction types for fuel cells are introduced, wherein tubular types according to the first construction types are distinguished by the structural robustness and planar types according to the second construction types by a higher performance density, but lower mechanical stability compared to the tubular types. On the basis of this consideration, a honeycomb structure fuel cell structure is suggested in order to combine the advantages of a high performance density and a structural robustness. It results from the following description that further functional groups can additionally be integrated into the honeycomb structure The specification US 2002/0155328A1 relates to a method and a device for the transmission of water vapor in a cathode supply system of a fuel cell. The supply of the oxidation means takes place via a plurality tubes arranged in parallel, which are washed around by the cathode gas of the fuel cell on the outer side, wherein humidity is transmitted from the cathode gas through the walls of the tubes to the supplied oxidation means. The ends of the tubes are embedded in synthetic resin for mechanical fixing.

The specification DE 10 2007 003 144A1, which appears to be the closest state of the art, relates to a device for conditioning reaction gases in fuel cells. It is suggested in this specification to combine the two functions "cooling" and "humidification" in one functional unit for the temperature adjustment and for the humidification of the air supplied as reaction medium, wherein so-called hollow fiber membranes are used, which consist of a temperature-resistant material. In a constructive implementation it is suggested in this specification to use high temperature-resistant membranes, preferably of ceramics and for example of zeolite, silicon dioxide, aluminum oxide or temperature-stable polymer membranes. These membranes are glued into a chamber, in order to guide the fresh gas with the exhaust gas over the hollow fiber membrane in such a manner and to contact them, that a transfer of water vapor from the exhaust gas to the fresh gas can take place through the membrane.

The invention is based on the object to suggest a supply assembly and a fuel cell system with the supply assembly, which show a cost-effective construction and/or a construction that can be loaded during operation.

This object is solved by a supply assembly with the characteristics of claim 1 and with a fuel cell system with the characteristics of claim 11.

Preferred or advantageous embodiments of the invention result from the dependent claims, the following description and the enclosed figures.

The invention thus relates to to a supply assembly, which is suitable and/or formed for coupling to a fuel cell device. The coupling is particularly formed in a releasable manner, so that the supply assembly can be decoupled from the fuel cell device. A plurality of fuel cells is preferably arranged in the fuel cell device.

The supply assembly is preferably formed as a cathode supply and has a gas-to-gas humidifier, which permits to humidify an oxidation means, particularly supplied air, for the fuel cell device with humidity from exhaust gases, particularly the cathode exhaust gases to the fuel cell device. In order to implement the humidification, the gas-to-gas humidifier has an exhaust gas region and an oxidation means region, which are separated from each other by a humidity-permeable separation layer, which permits a transmission of the humidity from the exhaust gas region into the oxidation means region for humidifying the oxidation means. As has already been explained at the outset, the humidification of the oxidation means serves for the conditioning for the requirements of the membrane, particularly the proton-conducting membrane (PEM), of the fuel cell device.

It is suggested within the scope of the invention that the gas-to-gas humidifier has a monolithic honeycomb structure for forming the exhaust gas region and the oxidation means region. The exhaust gas region and the oxidation means region are particularly arranged in a common monolithic honeycomb structure.

In the sense of the invention, a monolithic honeycomb structure is a structure which is formed in one piece. The one-piece form can be generated by a master forming, for example extruding, or by a removal process, e.g. milling, boring etc. from a semi-finished product. A honeycomb structure is a structure which has at least two honeycombs, namely one for the exhaust gas region and one for the oxidation means region. The honeycomb structure preferably has a plurality of honeycombs. The honeycombs can be formed in an arbitrary manner in their cross section, that is for example round, circular, oval, polygonal, hexagonal, rectangular etc. The monolithic honeycomb structure is for example formed as a ceramic body.

The advantages of the invention are that an elaborate casting of individual membranes in synthetic resin is omitted on the one hand compared to the state of the art. A mechanically stable and thus insensitive one-piece structure is used instead. On the other hand, preferred embodiments of the monolithic honeycomb structure are already used extensively with the exhaust gas aftertreatment of internal combustion engines and are thus available on the market in a cost-efficient and high quality manner.

In a preferred embodiment of the invention, the separation layer, through which the humidity is transmitted from the exhaust gas region into the oxidation means region or from the exhaust gas into the oxidation means, comprises the basic material of the monolithic honeycomb structure or is formed thereby. In a simple embodiment, the basic material is formed porously in such a manner that it has the necessary capabilities for the humidity transmission from its basic properties.

In a further preferred development of the invention, the separation layer—that is, the basic body of the monolithic honeycomb structure—is coated and/or treated with a material, as for example zeolite, silicon dioxide, temperature-stable polymers or aluminum oxide.

The permeability of the separation layer or of the basic body is formed in both embodiments in such a manner that oxygen from the oxidation means is held back and a permeability for humidity, particularly water vapor is achieved.

In a preferred constructive realization of the invention, the monolithic honeycomb structure has a plurality of channels as honeycombs, wherein a first group of channels forms the exhaust gas region and a second group of channels the oxidation means region. The groups can respectively have the same number of channels, the channels can however be distributed in an uneven manner. The channels can all be realized in the same manner, with changed embodiments the channels can—particularly depending on groups—be different.

In a possible embodiment, the channels of the first and the second group are arranged regularly, preferably in layers, in the monolithic honeycomb structure in an alternating manner and/or in turn. I a first layer are arranged channels of the oxidation means, in a second layer are arranged channels for exhaust gases and in a third layer are again arranged channels for the oxidation means, so that the humidity can be transmitted into two directions, starting from the center layer.

With a practical implementation, the monolithic honeycomb structure has one or several coupling openings for one of the two groups at one face side. The coupling openings are designed in such a manner that they can be coupled to a feed line or a discharge line for the exhaust gas or the oxidation means. The coupling openings of this group are preferably arranged on both face sides of the monolithic honeycomb structure.

It is in contrast also preferred that one or several coupling openings of the other group are closed at the same face side, for example by a distributor cap. The use of a distributor cap has the advantage that all coupling openings of the monolithic honey comb structure are opened at first, which are then closed selectively by the distributor cap. Instead of a distributor cap, other closure elements can also be used for blocking the coupling openings of the other group.

It is preferred that one or several coupling openings of one of the groups is or are arranged at the circumferential surface of the monolithic honeycomb structure, These are particularly the coupling openings for the group of channels, which cannot be reached through the face side. The coupling openings on the circumferential side are preferably created by a removing process, particularly slottings.

A separate guidance of the material flows of the exhaust gas and of the oxidation means is thus for example achieved by closed channel rows on the face side and by lateral slottings in the closed channel rows. A material flow can be fed to the monolithic honeycomb structure prepared in such a manner at the face side, which distributes itself on the channel rows that are not closed and flows through these. The second material flow is fed to the closed channel rows closed on the face side via the lateral coupling openings and again leaves the monolithic honeycomb structure at the other end by the lateral coupling openings which are also present there.

It is particularly preferred if the monolithic honeycomb structure only carries material flows of the first and the second group.

With a preferred further development of the invention, it is provided that the monolithic honeycomb structure is additionally dimensioned and/or formed as a charge-air cooler. The oxidation means inflow is often compacted, wherein compaction end temperatures up to 200° C. are reached. A temperature, which is too high for the fuel cell arrangement that is connected downstream. In that a monolithic honeycomb body is used as gas-to-gas humidifier, which only has a low heat sensitivity, the uncooled, compacted oxidation means can flow directly into the honeycomb structure and be cooled therein and also absorb humidity.

A further object of the invention relates to a fuel cell system with at least one fuel cell device and a supply assembly for supplying the fuel cell device with an oxidation means, wherein the supply assembly is formed as previously described.

The fuel cell system is preferably formed as a mobile fuel cell system, particularly for supplying a motor vehicle with drive energy. The fuel cell device preferably has one or several fuel cell stacks with a plurality of fuel cells, particularly more than 100, preferably more than 150 fuel cells.

The fuel cell system is preferably characterized in that the direct and/or the relevant heat and/or humidity transmission between the oxidation means and the cathode exhaust gas takes place via the gas-to-gas humidifier. Particularly, a further humidification device and/or a further charge-air cooler for cooling the compressed oxidation means can be foregone. A further possible use of the invention is thus shown, which can be seen on the one hand in a reduction of the number of necessary components and on the other hand in a higher load capacity of the supply assembly.

It is preferably provided that the fuel cell system has a bypass line that can be controlled or regulated, which is passed around the gas-to-gas humidifier, in order to adjust the temperature and simultaneously the humidity of the oxidation means by the ratio of the oxidation means guided through the gas-to-gas humidifier and the oxidation means guided past it.

In a practical development of the invention, a compressor for compressing the oxidation means is connected upstream of the gas-to-gas humidifier in a flow-technical manner and/or a turbine for relaxing the exhaust gas is connected downstream. The compressor and the turbine are preferably coupled to each other via a gear shaft, so that the energy from the exhaust gas removed during the relaxation can be supplied to the oxidation means as compression energy. A condensate separator for residual dehumidification is preferably connected downstream of the gas-to-gas humidifier.

Figure 2:
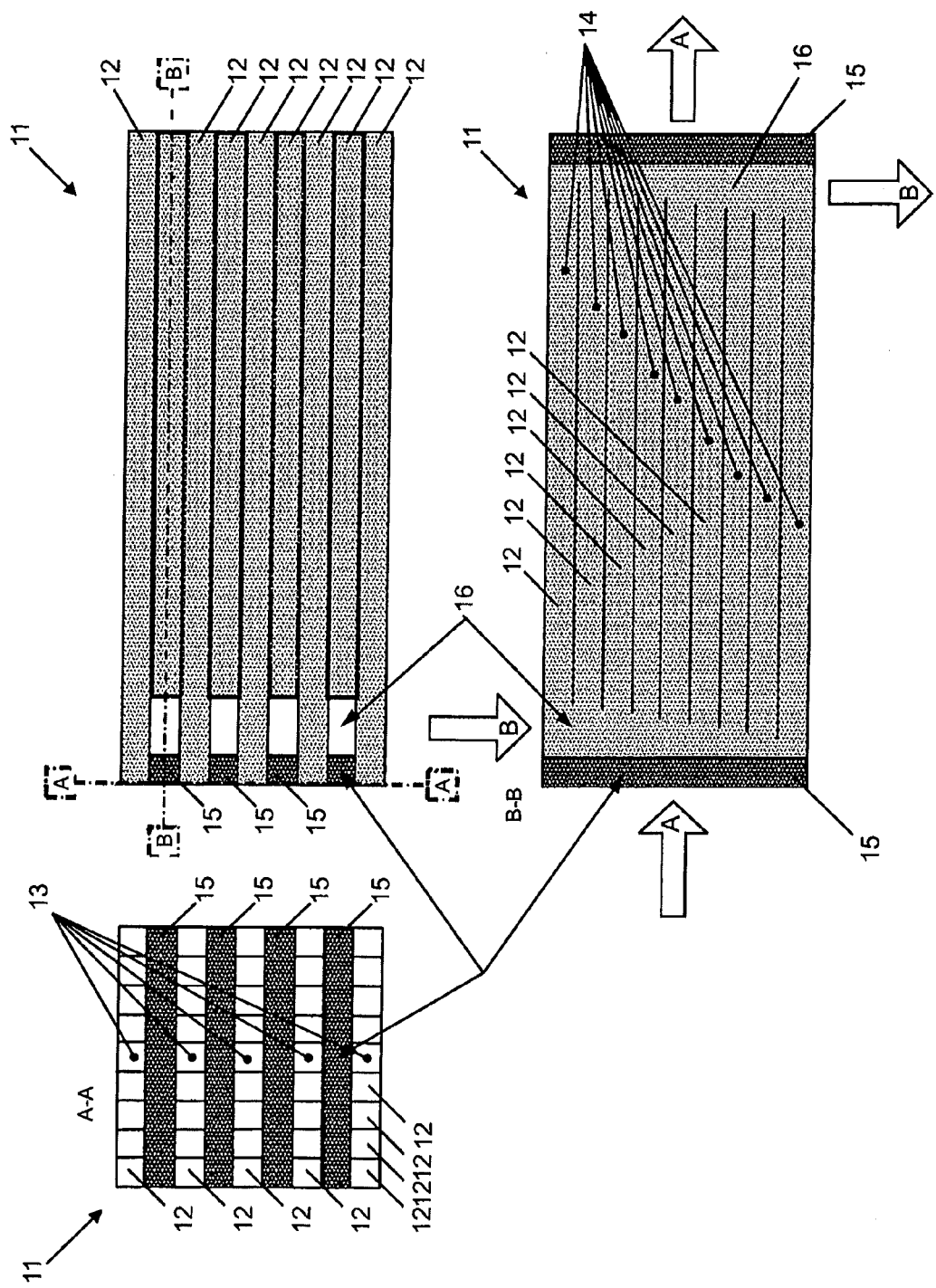

Further characteristics, advantages and effects of the invention result from the following description of preferred embodiments of the invention and the enclosed figures. It shows thereby:

FIG. 1 a schematic block diagram of a fuel cell system with a supply assembly as an embodiment of the invention;

FIG. 2 a monolithic honeycomb structure from the supply assembly in FIG. 1 in a front side top view, sectional side view and sectional top view.

FIG. 1 shows a fuel cell system 1 in a schematic block diagram. The fuel cell system 1 comprises a fuel cell device 2, in which are arranged a plurality of fuel cells (not shown), which respectively have a PE membrane (Proton Exchange Membrane (PEM)). A supply assembly 3 for supplying or discharging of the fuel cell device 2 with an oxidation means is connected to the fuel cell device 2 via connection lines. Further supply devices of the fuel cell device 2 are not shown, as for example the anode supply.

The supply assembly 3 has a supply branch 4 and a discharge branch 5 for the oxidation means. The supply branch 4 supplies the fuel cell device 2 with the oxidation means, the discharge branch 5 discharges the exhaust gases from the cathode region of the fuel cell device 2.

Surrounding air is supplied as oxidation means, which is first compressed in a compactor 6 and is then fed to a gas-to-gas humidifier 7 which—seen functionally—cools and humidifies the compacted oxidation means. The compacted and humidified oxidation means is then supplied to the fuel cell device 2. In order to be able to adjust the humidification and/or cooling, a bypass 8 is provided. which can be accessed via a valve in such a manner that a partial flow or the entire material flow of the oxidation means passes around the gas-to-gas humidifier 7 on the path to the fuel cell device 2. After the oxidation means has taken part in the electrochemical reaction in the fuel cell device 2, the exhaust gas flow is again fed to the gas-to gas humidifier 7, is there heated and dehumidified by the waste heat of the compacted oxidation means. After leaving the gas-to-gas humidifier 7, possible water present is separated in a condensate separator 9 and the exhaust gas is then relaxed in a turbine 10 and discharged to the surrounding. The turbine 10 is coupled to the compactor 6 via a gear shaft, so that the compactor 6 can be driven by the turbine 10.

The gas-to-gas humidifier 7 that takes on a dual function, namely on the one hand a cooling of the compressed oxidation means and secondly a humidification of the oxidation means by the humidity of the exhaust gas flow. The humidity is a waste product of the electrochemical reaction between the oxidation meansw and the fuel in the fuel cell device 2.

FIG. 2 shows several views of a monolithic honeycomb structure 11 in the form of a cuboid, which is integrated into the gas-to-gas humidifier 7. The monolithic honeycomb structure 11 is extruded in its basic form and manufactured for example of a temperature-stable ceramic material. It is thereby capable to endure the temperatures of up to 200° C. of the compressed oxidation means without damage.

The monolithic honeycomb structure 11 has a plurality of channels 12, which are inserted into the one-piece basic material in a regular manner and the same direction. The channels 12 are presently shown with a square cross section, but other, arbitrary forms are however also possible.

While the monolithic honeycomb structure 11 in its basic form only provides a plurality of the channels 12 oriented in parallel, two regions an oxidation means region 13 and an exhaust gas region 14 are formed or divided in the monolithic honeycomb structure 11 by means of the modifications explained in the following. The assignation of the regions according to the embodiment shown in FIG. 2 is thereby purely exemplary. It is thus also possible in principle that the regions designated with 14 function as oxidation means region and the regions designated with 13 as exhaust gas region. The two regions 13, 14 are separated from each other by intermediate walls from the basic material of the monolithic honeycomb structure 11 and are flown through in operation with the corresponding material flows oxidation means A and exhaust gas B. The assignation from A to the oxidation means and from B to the exhaust gas according to the embodiment shown in FIG. 2 is thereby purely exemplary. It is thus also possible in principle that A is assigned to the exhaust gas and B to the oxidation means.

A first modification is achieved by the closing of channel rows on the front side of the monolithic honeycomb structure 11, as is shown in the top view according to A-A. Each second row is hereby closed by closure elements 15, wherein the closure elements 15 are used on both face sides of the honeycomb structure 11. The oxidation means A can flow through all channels 12 by means of this modification, which show free coupling openings at the two face sides. The respective second row is in contrast blocked on both sides with closure elements 15.

In order to give the exhaust gas B a possibility for the flow-through of the monolithic honeycomb structure 11, it is laterally provided with slottings, 16, which extend in such a manner that all channels 12 in one cell are connected to each other in a communicating or open manner. The exhaust gases B can then be introduced into the monolithic honeycomb structure 11 from the circumferential side, distribute over all channels 12 at the slottings 16 and can flow through the monolithic honeycomb structure 11 in parallel and in the same or opposite direction.

The oxidation means flow A and the exhaust gas flow B are only separated from each other by the separation layer from the basic body of the monolithic honeycomb body 11, which is formed as a membrane in such a manner that oxygen is held back, but the water vapor or water is passed through. The separation layer can optionally be provided with a coating of zeolite, silicon dioxide or polymers.

List of Reference Numerals
1 Fuel cell system
2 Fuel cell device
3 Supply assembly
4 Supply branch
5 Discharge branch
6 Compactor
7 Gas-to-gas humidifier
8 Bypass
9 Condensate separator
10 Turbine
11 Honeycomb structure
12 Channels
13 Oxidation means region
14 Exhaust gas region
15 Closure elements
16 Slottings

The invention claimed is:

1. A supply assembly (3) for coupling to a fuel cell device (2), having a gas-to-gas humidifier (7) that is designed and/or arranged in order to humidify the oxidation means (A) for the fuel cell device (2) by means of the humidity from the exhaust gases (B) of the fuel cell device (2),
   wherein the gas-to-gas humidifier (7) has an exhaust gas region (14) and an oxidation means region (13) that are separated from one another by a separation layer,
   wherein the separation layer enables a transmission of the humidity from the exhaust gas region (14) into the oxidation means region (13) for humidification of the oxidation means (A),
   wherein the gas-to-gas humidifier (7) has a monolithic honeycomb structure (11) for forming the exhaust gas region (14) and the oxidation means region (13),
   wherein a plurality of channels (12) are formed in or inserted into the monolithic honeycomb structure (11), wherein a first group of channels forms the exhaust gas region (14) and a second group of channels fowls the oxidation means region (13), and
   wherein one or several open coupling openings for one of the first and second groups is or are arranged at a face side of the monolithic honeycomb structure (11).

2. The supply assembly (3) according to claim 1, wherein the separation layer is coated and/or treated with a functional material from the group zeolite, silicon dioxide or polymer.

3. The supply assembly (3) according to claim 1, wherein the first and the second group are arranged alternately in the monolithic honeycomb structure (11) in a regular manner.

4. The supply assembly (3) according to claim 1, wherein one or several open coupling openings for one of the first and second groups is or are arranged at a face side of the monolithic honeycomb structure (11), and wherein one or several coupling openings of the other of the first and second groups is or are closed at the face side.

5. The supply assembly (3) according to claim 1, wherein one or several coupling openings for one of the first and second groups is or are arranged at the circumferential surface of the monolithic honeycomb structure (11).

6. The supply assembly (3) according to claim 5, wherein the coupling openings on the circumferential side are created by cuttings, particularly slottings (16).

7. The supply assembly (3) according to claim 1, wherein the monolithic honeycomb structure (11) is additionally dimensioned and/or formed as a charge-air cooler.

8. A fuel cell system (1) with at least one fuel cell device (2) and a supply assembly (3) for supplying the fuel cell device (2) with an oxidation means (A),
  wherein the supply assembly (3) is has a gas-to-gas humidifier (7) that is designed and/or arranged in order to humidify the oxidation means (A) for the fuel cell device (2) by means of the humidity from the exhaust gases (B) of the fuel cell device (2),
  wherein the gas-to-gas humidifier (7) has an exhaust gas region (14) and an oxidation means region (13) that are separated from one another by a separation layer,
  wherein the separation layer enables a transmission of the humidity from the exhaust gas region (14) into the oxidation means region (13) for humidification of the oxidation means (A), and
  wherein the gas-to-gas humidifier (7) has a monolithic honeycomb structure (11) for forming the exhaust gas region (14) and the oxidation means region (13),
  wherein a plurality of channels (12) are formed in or inserted into in the monolithic honeycomb structure (11), wherein a first group of channels forms the exhaust gas region (14) and a second group of channels forms the oxidation means region (13), and
  wherein one or several open coupling openings for one of the first and second groups is or are arranged at a face side of the monolithic honeycomb structure (11).

9. The fuel cell system (1) according to claim 8, wherein the humidity transmission between the oxidation means (A) and the exhaust gas (B) takes place in the gas-to-gas humidifier (7).

10. The fuel cell system (1) according to claim 9, further comprising a bypass line (8), which passes around the gas-to-gas humidifier (7).

11. The fuel cell system (1) according to claim 8, wherein a compressor (6) for compressing the oxidation means (A) is connected upstream of the gas-to-gas humidifier (7) in a flow-technical manner and/or a turbine (10) for relaxing the exhaust gas (B) is connected downstream.

12. The fuel cell system (1) according to claim 8, wherein a condensate separator is connected downstream of the gas-to-gas humidifier (7).

13. The supply assembly (3) according to claim 1, wherein the first and the second group are arranged alternately in the monolithic honeycomb structure (11) in a regular manner in layers.

14. The fuel cell system (1) according to claim 8, wherein the first and the second group are arranged alternately in the monolithic honeycomb structure (11) in a regular manner in layers.

15. The supply assembly (3) according to claim 1, wherein one or several open coupling openings for one of the first and second groups is or are arranged at a face side of the monolithic honeycomb structure (11), and wherein one or several coupling openings of the other of the first and second groups is or are closed at the face side by a distributor flap.

* * * * *